US009218146B2

(12) United States Patent
Nishida et al.

(10) Patent No.: US 9,218,146 B2
(45) Date of Patent: Dec. 22, 2015

(54) INFORMATION PROCESSING SYSTEM, METHOD OF PROCESSING INFORMATION, PROGRAM, AND RECORDING MEDIUM

(71) Applicants: Takayori Nishida, Tokyo (JP); Munetake Moroyama, Tokyo (JP)

(72) Inventors: Takayori Nishida, Tokyo (JP); Munetake Moroyama, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/329,012

(22) Filed: Jul. 11, 2014

(65) Prior Publication Data
US 2015/0029534 A1 Jan. 29, 2015

(30) Foreign Application Priority Data
Jul. 24, 2013 (JP) .................. 2013-153547

(51) Int. Cl.
G06K 15/00 (2006.01)
G06F 3/12 (2006.01)
H04N 1/00 (2006.01)

(52) U.S. Cl.
CPC ............ *G06F 3/1238* (2013.01); *G06F 3/1222* (2013.01); *G06F 3/1267* (2013.01); *G06F 3/1288* (2013.01); *H04N 1/00352* (2013.01); *G06F 3/1204* (2013.01)

(58) Field of Classification Search
CPC ... G06F 3/1222; G06F 3/1238; G06F 3/1267; G06F 3/1288; G06F 3/1204; H04N 1/00352
USPC .................................................. 358/1.14, 1.1
See application file for complete search history.

(56) References Cited

U.S. PATENT DOCUMENTS

2001/0017712 A1* 8/2001 Kasatani ...................... 358/1.15
2008/0168542 A1* 7/2008 Sato .......................... G06F 21/34
726/5
2012/0300268 A1* 11/2012 Oseto et al. .................... 358/474
2013/0329245 A1 12/2013 Nishida

FOREIGN PATENT DOCUMENTS

JP 2001-051915 2/2001
JP 2004-236348 8/2004
JP 2012-248006 12/2012
JP 2014-016979 1/2014

* cited by examiner

Primary Examiner — Iriana Cruz
(74) Attorney, Agent, or Firm — IPUSA, PLLC

(57) ABSTRACT

An information processing system includes a first receiving unit receiving a print request; a first specifying unit specifying user identification information stored in a first memory unit in association with first identification information related to a transmission source of the print request; an acquiring unit acquiring second identification information from the print request when the user identification information is not specified by the first specifying unit; a second memory unit storing data related to the print request in association with the user identification information specified by the first specifying unit or the second identification information acquired by the acquiring unit; a second receiving unit receiving the user identification information or the second identification information from an apparatus connected with the information processing system; and a sending unit sending the user identification information received by the second receiving unit or the data stored in the second memory unit to the apparatus.

18 Claims, 12 Drawing Sheets

FIG.6

| USER NAME | PASSWORD | MAIL ADDRESS | ..... |
|---|---|---|---|
| A | ...... | aaa@xxxxx | ..... |
| B | ...... | bbb@xxxxx | ..... |
| .. | .. | .. | .. |

| JOB NAME | USER MODE | USER NAME | PRINT DATA | ..... |
|---|---|---|---|---|
| XXX | G | 1234 | ..... | ..... |
| YYY | U | A | ..... | ..... |
| .. | .. | .. | .. | .. |

| CARD ID | USER NAME | PASSWORD | USER MODE | AUTHENTICATED USER NAME |
|---|---|---|---|---|
| 0001 | A | xxxxxx | U | |
| 0002 | B | yyyyyy | U | |
| .. | .. | .. | .. | .. |
| 9001 | 9001 | | G | A |
| .. | .. | .. | .. | .. |

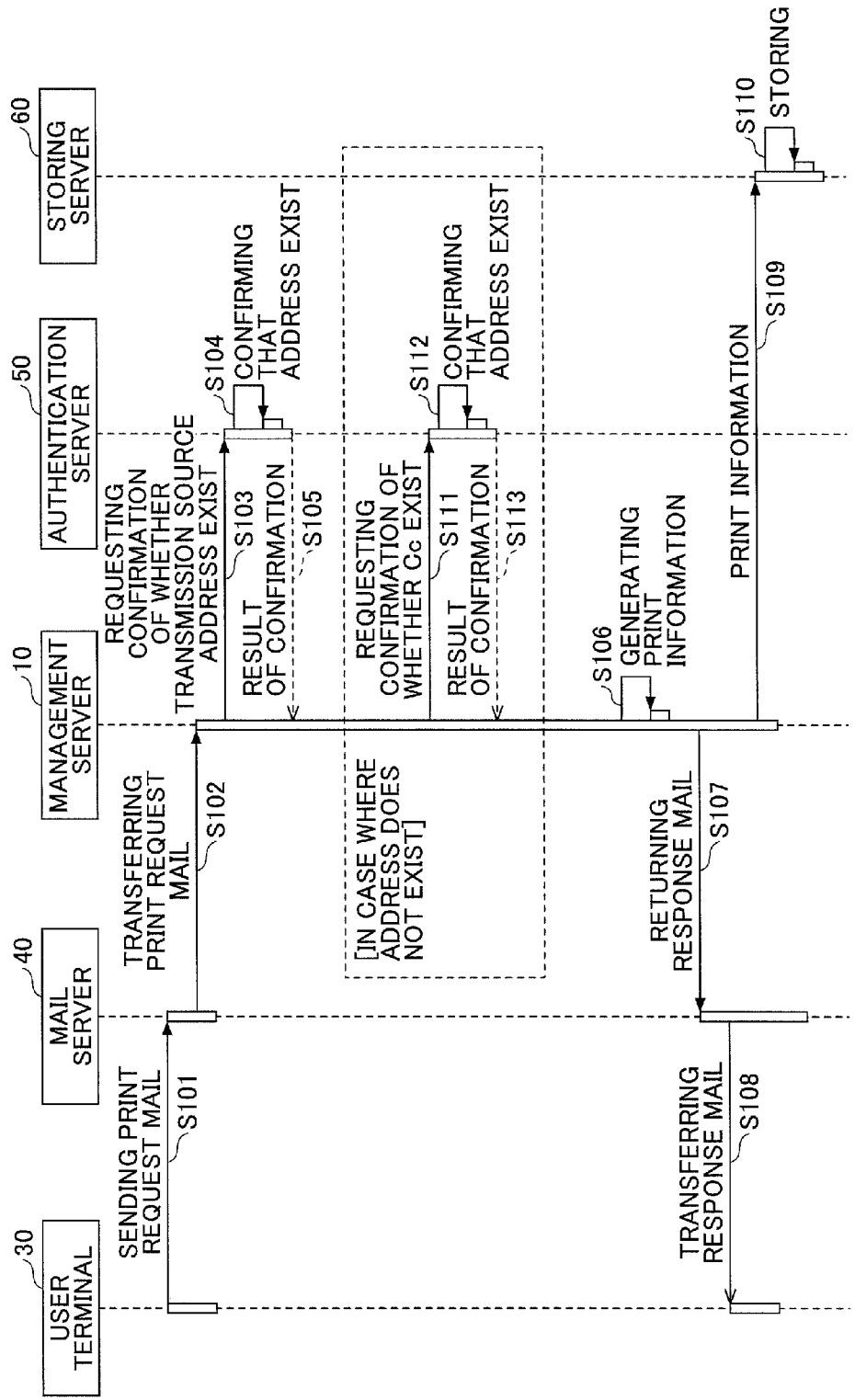

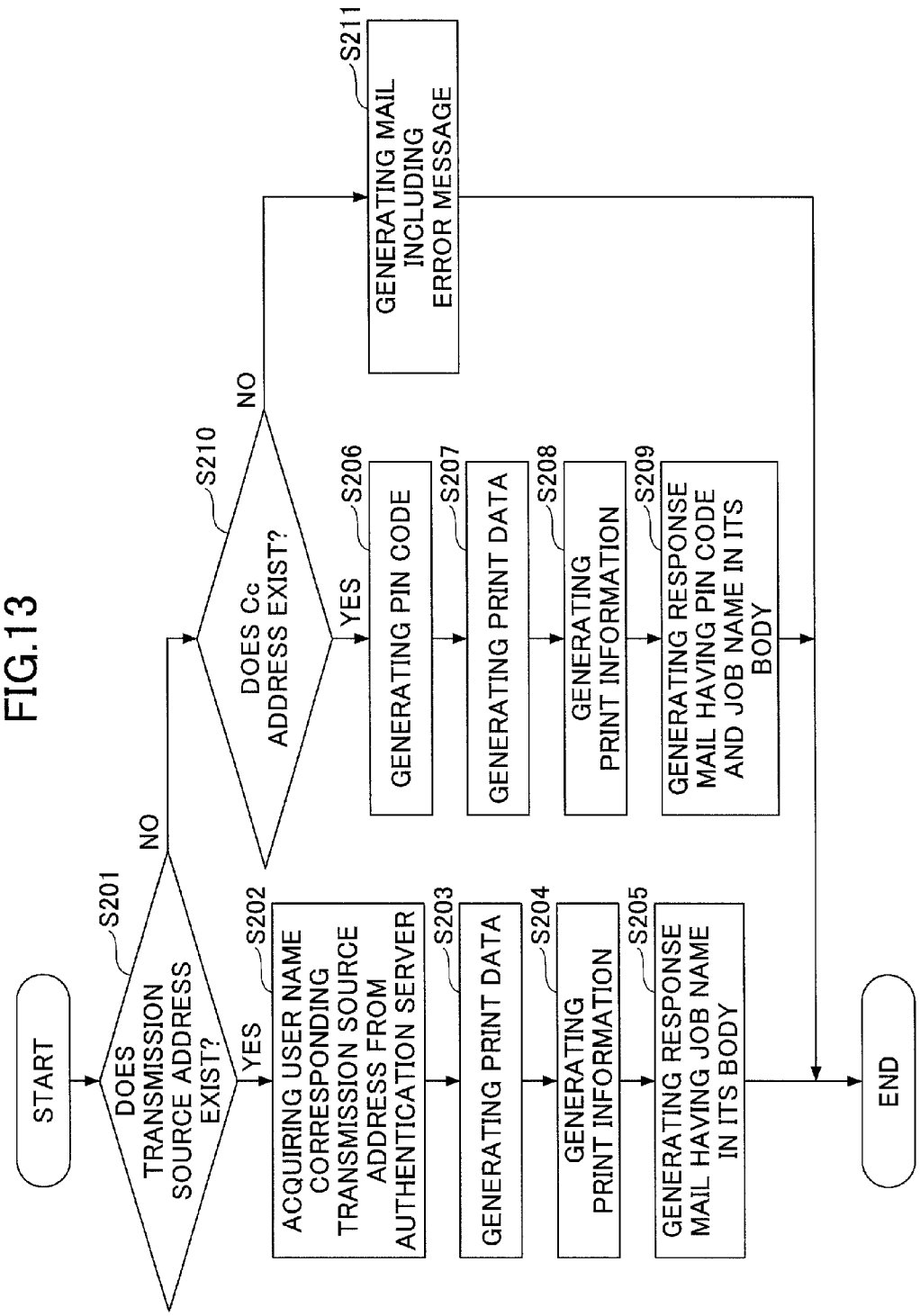

INFORMATION PROCESSING SYSTEM, METHOD OF PROCESSING INFORMATION, PROGRAM, AND RECORDING MEDIUM

BACKGROUND OF THE INVENTION

1. Field of the Invention

The present invention generally relates to an information processing system, a method of processing information, a program, and a recording medium.

2. Description of the Related Art

In an exemplary personal computer (PC) or the like, there is a system where a print data is not immediately printed in response to a print instruction input by a user and are stored in a memory device provided inside a predetermined server or an image forming apparatus in association with a user name of the user. When a user inputs a user name and a password through an operation panel of an image forming apparatus, the image forming apparatus performs an authentication process for the user name and the password. If the authentication is successful, the image forming apparatus causes list information of print data, which are included in print data stored in the memory device and associated with the user name, to be displayed on the operation panel. The image forming apparatus acquires the print data selected from the list information from the memory device and performs printing.

According to the system, because printed material is output when a user exists near the image forming apparatus, it is possible to prevent the printed material from being left and another person from taking the printed material by mistake. As a result, it is possible to ensure security of printed information.

However, with the above system, only a user, who previously has an account to be authenticated, can print. For example, it may be inconvenient for a visitor who does not have the account, or the like, because this visitor needs to ask a person who has the account, for printing. Therefore, it is possible to prepare a common visitor account for visitors. However, in this case, because the common account is allocated to a plurality of visitors, one of the visitors can operate print data of the other visitors. As a result, the security of printed information may be spoiled to degrade properties of the system.

Further, it is possible to install an image forming apparatus for guests. However, an additional cost for the image forming apparatus occurs, and a space for installing the image forming apparatus is necessary. Therefore, it is not a good solution.

For example, Japanese Laid-Open Patent Application Publication No. 2004-236348 and Japanese Laid-Open Patent Application Publication No. 2001-051915 disclose these techniques.

SUMMARY OF THE INVENTION

Therefore, it is preferable to enable a user without an operation authority for using an apparatus to use the apparatus.

One aspect of the embodiments of the present invention may be to provide an information processing system including at least one computer that includes a first receiving unit that receives a print request; a first specifying unit that specifies user identification information stored in a first memory unit in association with first identification information related to a transmission source of the print request; an acquiring unit that acquires second identification information from the print request when the user identification information is not specified by the first specifying unit; a second memory unit that stores data related to the print request in association with the user identification information specified by the first specifying unit or the second identification information acquired by the acquiring unit; a second receiving unit that receives the user identification information or the second identification information from an apparatus connected with the information processing system through a network; and a sending unit that sends the user identification information received by the second receiving unit or the data stored in the second memory unit to the apparatus.

Additional objects and advantages of the embodiments will be set forth in part in the description which follows, and in part will be clear from the description, or may be learned by practice of the invention. Objects and advantages of the invention will be realized and attained by means of the elements and combinations particularly pointed out in the appended claims.

It is to be understood that both the foregoing general description and the following detailed description are exemplary and explanatory only and are not restrictive of the invention as claimed.

BRIEF DESCRIPTION OF THE DRAWINGS

FIG. 6 illustrates an exemplary structure of a user information memory unit.

FIG. 7 illustrates an exemplary structure of a print information memory unit of the first embodiment of the present invention.

FIG. 11 illustrates an exemplary structure of a card information memory unit.

FIG. 12 is a sequence chart illustrating a procedure in a storing process for storing print data of a second embodiment.

FIG. 13 is a flowchart for explaining an exemplary procedure of print information generating process of the second embodiment of the present invention.

DETAILED DESCRIPTION OF THE PREFERRED EMBODIMENTS

A description is given below, with reference to the FIG. 1 through FIG. 13 of embodiments of the present invention. Where the same reference symbols are attached to the same parts, repeated description of the parts is omitted.

Reference symbols typically designate as follows:
1: print system;
10: management server;
11: mail receiving unit;
12: address confirming unit;
13: card ID acquiring unit;
14: print information generating unit;
15: response mail generating unit;
16: mail returning unit;
17: print information sending unit;
18: address-corresponding information memory unit;
20: image forming apparatus;
21: controller;
22: scanner;
23: printer;
24: modem;
25: operation panel;
26: network interface;
27: SD card slot;
28: card reader;
30: user terminal;
31: web browser;
32: mail sending unit;
40: mail server;
50: authentication server;
51: request responding unit;
52: user information memory unit;
60: storing server;
61: print information receiving unit;
62: print information memory unit;
63: print information providing unit;
70: authentication relay server;
71: authentication relay unit;
72: card information memory unit;
80: SD card;
90: card;
100: drive device;
101: recording medium;
102: auxiliary memory device;
103: memory device;
104: CPU;
105: interface device;
211: CPU;
212: RAM;
213: ROM;
214: HDD;
215: NVRAM; and
B: bus.

First Embodiment

Figure 1:
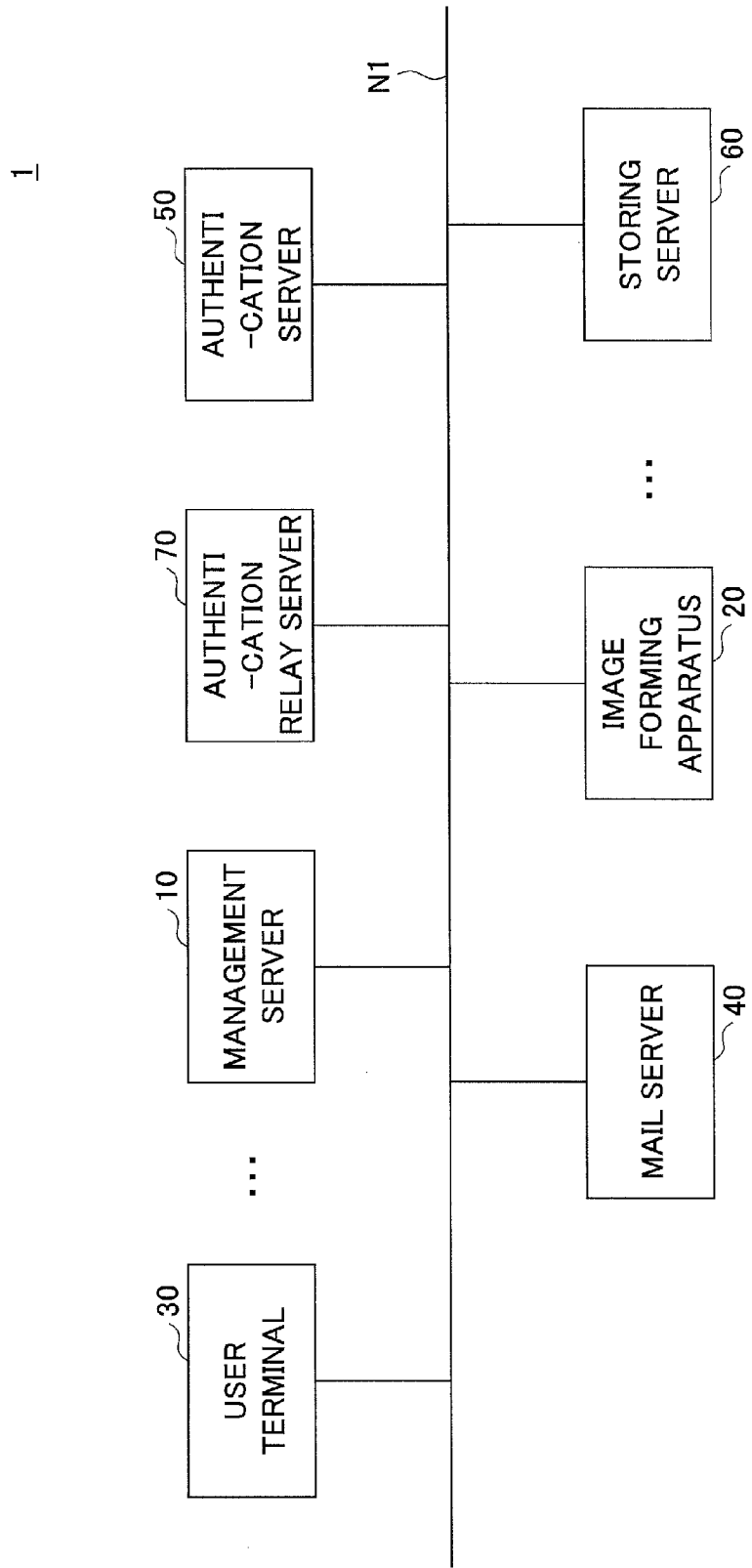
FIG. 1 is a schematic view for illustrating an exemplary configuration of a print system of a first embodiment of the present invention.

Hereinafter, an embodiment of the present invention is described based on the figures. FIG. 1 illustrates an exemplary configuration of a print system of a first embodiment of the present invention. In the print system 1 illustrated in FIG. 1, at least one user terminal 30, a mail server 40, a management server 10, an authentication server 50, an authentication relay server 70, a storing server 60, and at least one image forming apparatus 20, and so on are connected through a network N1 such as a Local Area Network (LAN) or the Internet. A part of or all of the network N1 may be a wireless communication network. A mobile communication network may intervene between the user terminal 30 and the network N1. The print system 1 is operated in a certain organization of a business enterprise (a company) or the like. Within the embodiment of the present invention, the organization is referred to as "a company A".

The user terminal 30 is an information processing apparatus directly operated by a user of the print system 1. For example, the user operates the user terminal 30 to cause the print system 1 to receive a print request. An example of the user terminal 30 is a personal computer (PC), a mobile phone, a smart phone, a tablet-type terminal, a personal digital assistance (PDA), or the like. Each of multiple user terminals 30 may be a model, which are mutually different.

In the embodiment, users of the print system 1 are distinguished between an "authenticated user" and a "guest user". The authenticated user is a user whose user information is registered into the print system 1 (specifically, into a user information memory unit 52 described below). Said differently, the authenticated user is planned as a user of the print system 1. An exemplary authenticated user is an employee of the company A. The user information of the guest user is not registered into the print system 1. Said differently, the guest user inherently is other than employees of the company A as an exemplary guest user having a use authority for the print system 1.

The mail server 40 is a computer, which transfers an electronic mail sent from the user terminal 30 or an electronic mail sent from the management server 10. For example, the user terminal 30 sends an electronic mail including a print request to the management server 10 in response to the instruction from the user. Electronic data to be printed is attached to the electronic mail including the print request. The data format of the electronic data is not limited to a predetermined format. Hereinafter, an electronic mail, which is sent from the user terminal 30 and includes a print request, is referred to as a "print request mail". It is necessary that identification information (hereinafter, a "card ID") of a guest card lent to the guest user is designated in a print request mail sent from the guest user. For example, the subject (the title) of the print request mail or a predetermined format (for example, "CardID=xxx") inside the body indicates a card ID. The card ID may be described on, for example, the guest card so that the guest user can observe the card ID.

The authentication server 50 is a computer for managing information (hereinafter, referred to as "user information") including the user name, the password, and the mail address of each authenticated user. For example, the authentication server 50 performs an authentication process in receipt of an authentication request, where a user name, a password, or the like is designated. Further, the authentication server 50 performs processes corresponding to an existence confirming request of confirming the mail address and an acquisition request of a user name corresponding to the mail address.

The authentication relay server 70 hides the authentication server 50 from the image forming apparatus 20, and provides an interface related to the authentication process suitable for the image forming apparatus 20 to the image forming apparatus 20. The authentication relay server 70 receives an authentication request for a user, who requests a login to the image forming apparatus 20, from the image forming apparatus 20. Then, the authentication request is converted to a format suitable for the authentication server 50 and sends the converted format to the authentication server 50.

The management server 10 is a computer, which performs generation of the print data for electronic data contained in the print request mail in response to the receipt of the print request mail. The print data have a data format, which can be comprehended by the image forming apparatus 20. The management server 10 sends generated print data to a storing server 60 by associating the generated print data with the user name of a user, who is a transmission source (a sender) of the print request mail, or an identifier generated for each print request mail. When the transmission source address of the print request mail is managed by the authentication server 50 by being associated with the user name, the user name is associated with print data. When the transmission source address of the print request mail is not managed by the authentication server 50 with an association with the user name, the print data are associated with a card ID designated to the print request mail. Said differently, the card ID is associated with the print data related to the print request mail received from the guest user.

The storing server 60 is a computer, which stores the print data sent from the management server 10.

The image forming apparatus 20 is an apparatus performing printing of print data specified from the print data stored in the storing server 60 based on a card set to the image forming apparatus 20 when the user logs in. Said differently, within the first embodiment, it is necessary to present a card (a card 90 illustrated in FIG. 3) in order to log in the image forming apparatus 20. Each authenticated user is provided with the card 90 from an organization (for example, the company A), to which the authenticated user belongs. Depending on a security level necessary for an operation of the image forming apparatus 20, multiple authenticated users may commonly share one card 90. Meanwhile, the card 90 for the guest user is temporarily lent to the guest user, who wishes to use the image forming apparatus 20. Hereinafter, the card 90 owned by the authenticated user is referred to as an "authenticated card", and the card 90 lent to the guest user is referred to as a "guest card".

At least two apparatuses among the management server 10, the authentication relay server 70, the authentication server 50, the mail server 40, and the storing server 60 may be structured by one computer or multiple computers. The number of the computers may be appropriately determined according to an operation.

Figure 2:
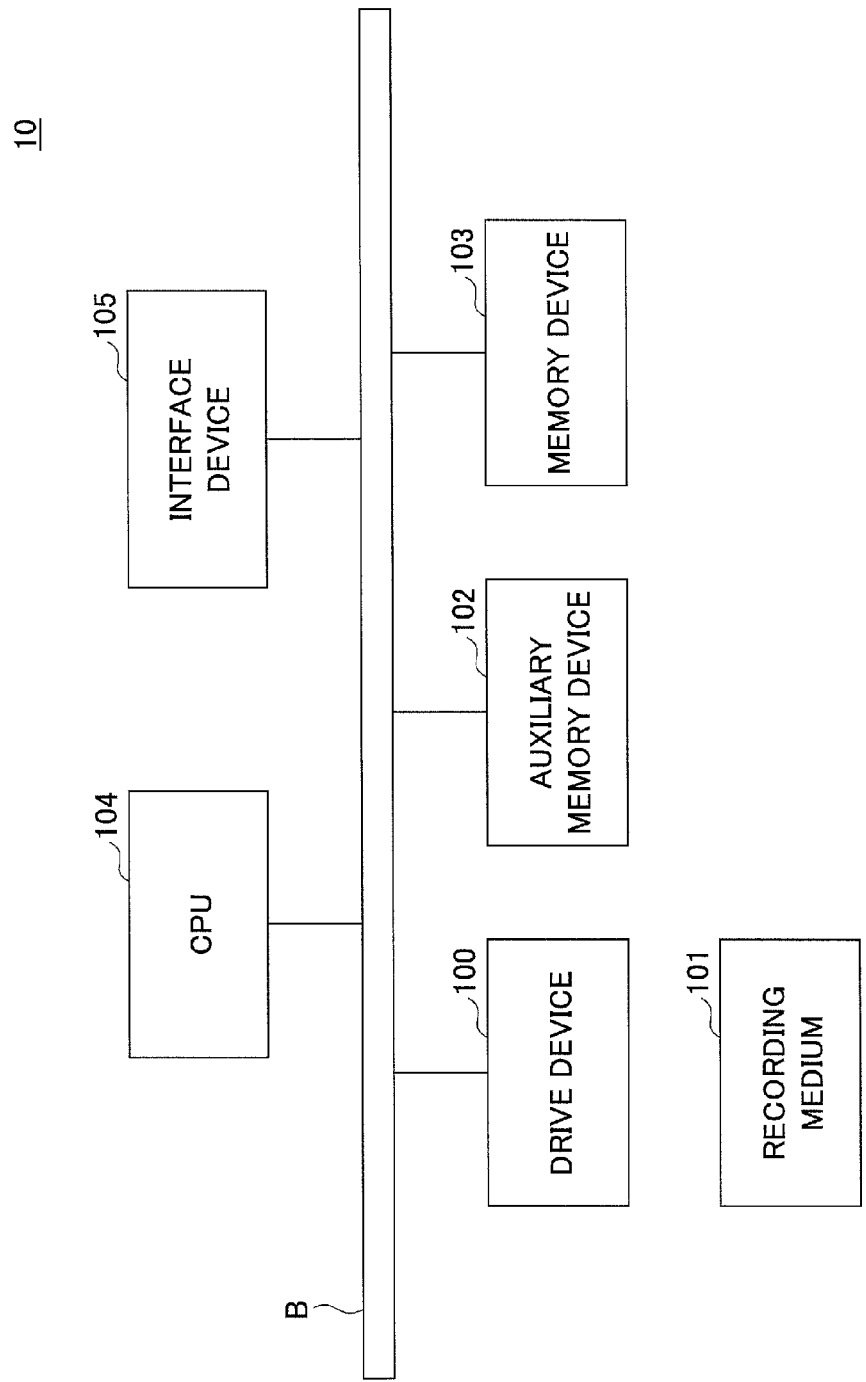
FIG. 2 illustrates an exemplary hardware configuration of a management server of the first embodiment of the present invention.

FIG. 2 illustrates an exemplary hardware configuration of the management server of the first embodiment of the present invention. The management server 10 illustrated in FIG. 2 includes a drive device 100, an auxiliary memory device 102, a memory device 103, a CPU 104, and an interface device 105, or the like, which are mutually connected by a bus B.

A program realizing processes in the management server 10 is supplied by a recording medium 101 such as a CD-ROM. When the recording medium 101 with the program recorded on it is installed in the drive device 100, the program is installed into the auxiliary memory device 102 through the drive device 100 from the recording medium 101. However, the program may not always be installed from the recording medium 101 and may be downloaded from another computer through the network. The auxiliary memory device 102 stores necessary files, data, and so on in addition to the installed program.

The memory device 103 reads out the program from the auxiliary memory device 102 when the program is instructed to be invoked and stores the read program into the memory device 103. The CPU 104 performs a function related to the management server 10 in conformity with the program stored in the memory device 103. The interface device 105 is used as an interface for connecting to the network.

Figure 3:
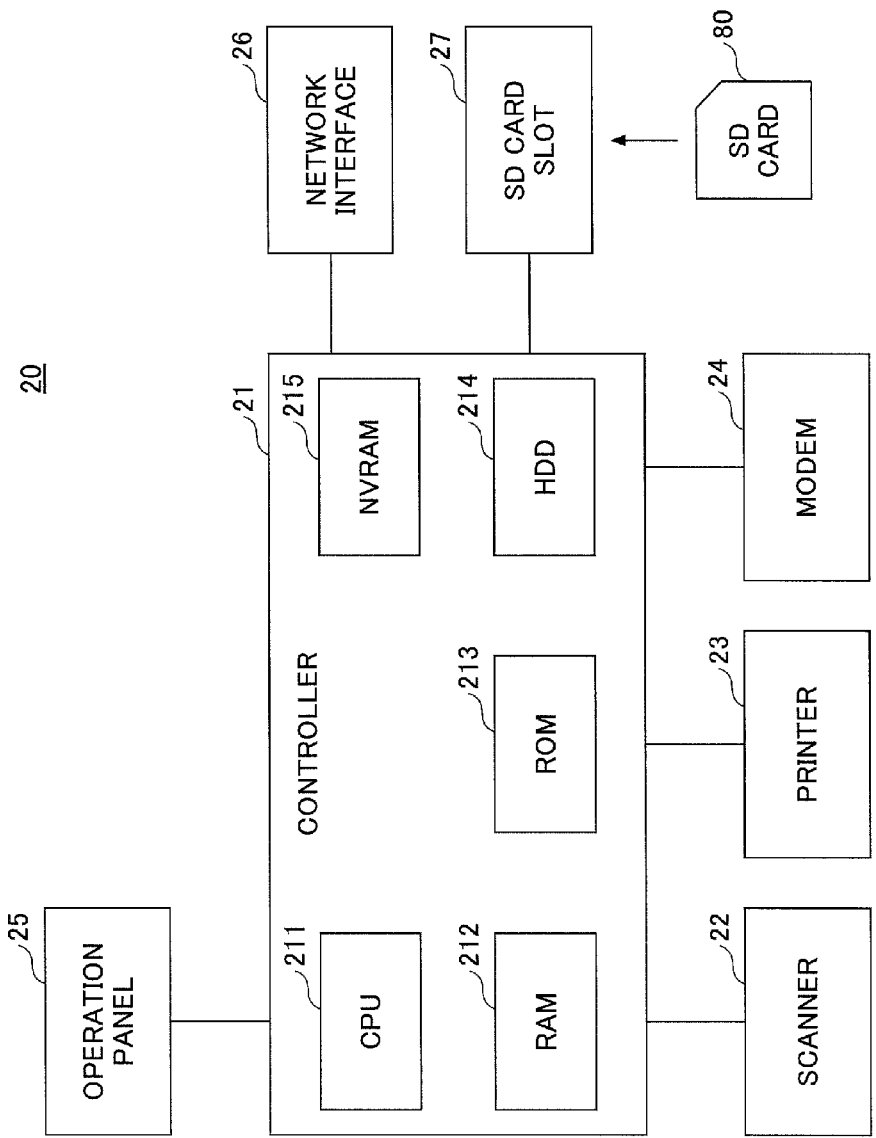
FIG. 3 illustrates an exemplary hardware configuration of an image forming apparatus of the first embodiment of the present invention.

FIG. 3 illustrates an exemplary hardware structure of the image forming apparatus of the first embodiment. Referring to FIG. 3, the image forming apparatus 20 includes hardware such as a controller 21, a scanner 22, a printer 23, a modem 24, an operation panel 25, a network interface 26, an SD card slot, and a card reader 28.

The controller 21 includes a CPU 211, a RAM 212, a ROM 213, an HDD 214, an NVRAM 215, and so on. Various programs and data used by the programs are stored in the ROM 213. The RAM 212 is used as a memory area for loading the programs, a work area for the loaded programs, or the like. The CPU 211 performs various functions by processing the program loaded into the RAM 212. The HDD 214 records programs, various data used by the programs, or the like. The NVRAM 215 stores various setup information or the like.

The scanner 22 is hardware (an image reading unit) for reading image data from an original (an original manuscript). The printer 23 is hardware (a printing unit) for printing print data on a print paper. The modem 24 is hardware for connecting the image forming apparatus 20 to a telecommunication line (not illustrated) and is used for sending and receiving the image data with fax communications. The operation panel 25 is hardware provided with an input unit for receiving an input from the user such as a button, a display unit such as a liquid crystal panel or the like. The liquid crystal panel may have a touch panel function. In this case, the liquid crystal panel may also have the function of the input unit. The network interface 26 is hardware for connecting the image forming apparatus 20 to a wired or wireless network such as LAN. The SD card slot 27 is used to read a program recorded in the SD card 80. Said differently, not only the programs stored in the ROM 213 but also the programs stored in the SD card 80 may be loaded into the RAM 212 and executed by the image forming apparatus 20. The SD card 80 may be substituted by another recording medium such as a CD-ROM and a universal serial bus (USB) memory. The type of the recording medium taking a place corresponding to the SD card 80 may not be limited to a predetermined type. In this case, the SD card slot 27 may be replaced by hardware depending on kinds of the recording medium. The card reader 28 is a so-called card reader (a card reading apparatus), which reads information from the card 90. The card reader 28 may be built in the image forming apparatus 20 or may be connected to the image forming apparatus 20 through an external interface (for example, an USB interface) provided with the image forming apparatus 20. The card reader 28 may be of a contact type or a noncontact type. The card 90 is not limited to the IC card, and may be a magnetic card as long as a unique ID (a unique card number) is recorded in each card. The card ID is ordinarily referred to as a universal ID or a card serial number. Specifically, the card 90 is a Proximity card, a Mifare card, a Java ("Java" is the registered trademark) card, or the like.

Within this embodiment, the image forming apparatus 20 needs not always have the scanner 22 and the modem 24. Said differently, the image forming apparatus 20 may be a printer instead of a multifunction peripheral.

Figure 4:
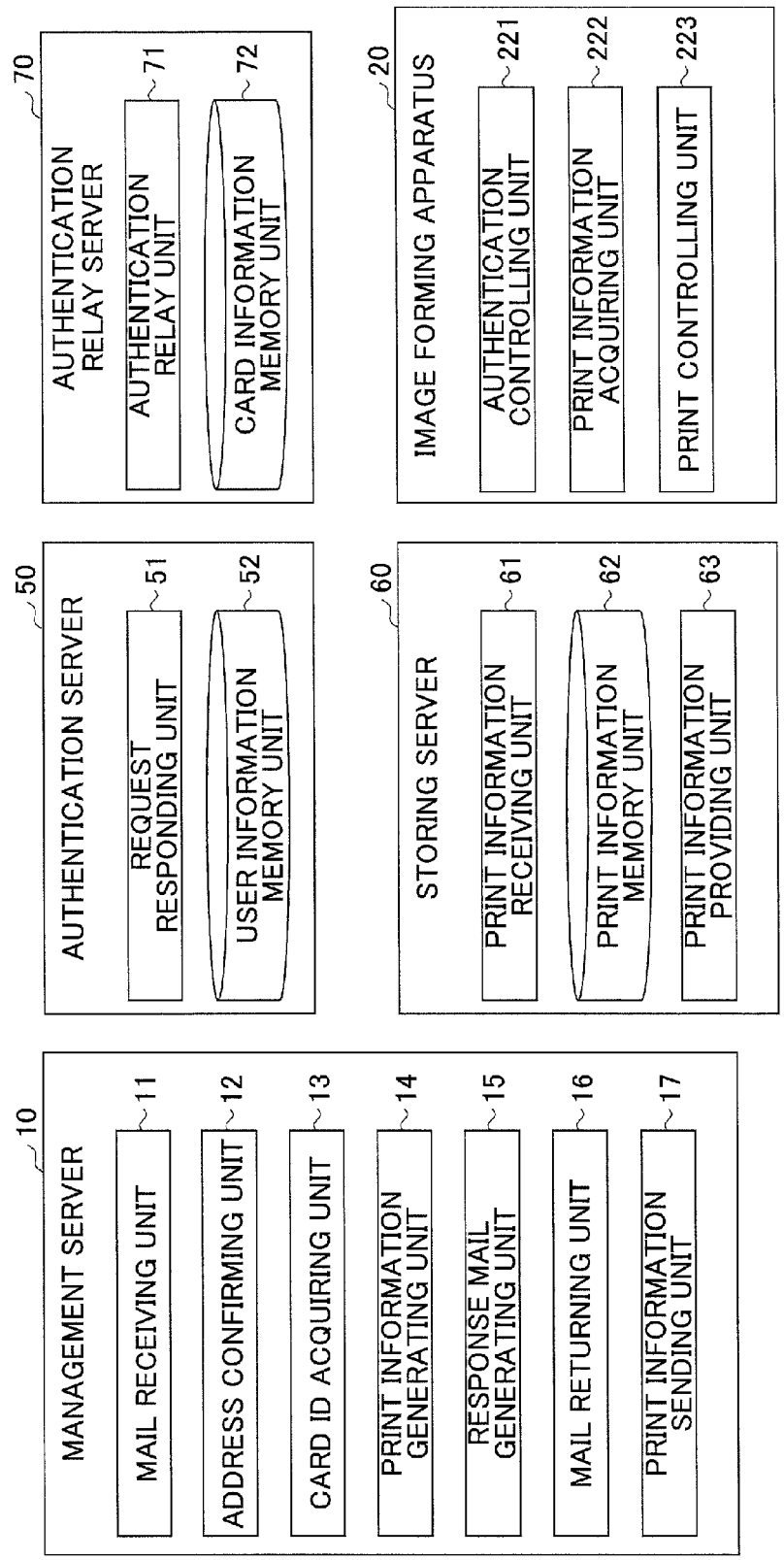
FIG. 4 is a schematic view for illustrating an exemplary functional configuration of a print system of the first embodiment of the present invention.

FIG. 4 illustrates an exemplary configuration of a print system of the first embodiment of the present invention. Referring to FIG. 4, the management server 10 includes a mail receiving unit 11, an address confirming unit 12, a card ID acquiring unit 13, a print information generating unit 14, a response mail generating unit 15, a mail returning unit 16, a print information sending unit 17, and so on. These units are substantialized when one or more programs installed in the management server 10 are executed by the CPU 104.

The mail receiving unit 11 receives a print request mail. The print request mail includes data (for example, a mail body, an attached file, or the like) required to be printed by the user. For example, the user sends a mail including data to be printed to the mail address (the transmission destination) of a specific domain from the user terminal 30. The mail receiving unit 11 receives the mail, in which the specific domain is set to the destination. Thus, it is recognized that the mail is the print request mail.

The address confirming unit 12 specifies the user name of the authenticated user corresponding to the transmission source address of the print request mail. Specifically, the address confirming unit 12 sends an existence confirming request of confirming whether the transmission source address of the print request mail to the authentication server 50 to thereby confirm whether the transmission source address is registered in the authentication server 50. The address confirming unit 12 acquires the user name corresponding to the transmission source address from the authentication server 50 in a case where the transmission source address is registered in the authentication server 50. The card ID acquiring unit 13 acquires the card ID designated in the print request mail from the print request mail in a case where the transmission source address is not registered in the authentication server 50 (said differently, the user name of the authenticated user corresponding to the transmission source address is specified). The print information generating unit 14 generates the print information corresponding to the print request mail. The print information includes information related to print data and a print job of the print data, the user name, the card ID, and so on.

The response mail generating unit 15 generates an email (hereinafter, a "response mail") as a response to the print request mail. For example, the response mail includes identification information of a print job based on each print data.

The mail returning unit 16 returns the response mail to the transmission source address of the print request mail. The print information sending unit 17 sends the print information to the storing server 60 to store the print information into the storing server 60.

The authentication server 50 includes the request responding unit 51, the user information memory unit 52, and so on. The user information memory unit 52 stores user information for each authenticated user. The request responding unit 51 performs a process corresponding to the authentication request, the existence confirming request of confirming the existence of the mail address, the acquisition request of acquiring the user name corresponding to the mail address, or the like. The request responding unit 51 is substantialized by a process of a program, which is installed in the authentication server 50, performed by the CPU of the authentication server 50. The user information memory unit 52 is substantialized by an auxiliary memory device of the authentication server 50, a memory device connected to the authentication server 50 through the network, or the like.

The storing server 60 includes a print information receiving unit 61, a print information memory unit 62, a print information providing unit 63, and so on. The print information receiving unit 61 receives the print information sent from the management server 10 and memorizes (stores) the received print information in the print information memory unit 62. The print information providing unit 63 returns the print information, which is memorized (stored) in the print information memory unit 62 and includes the user name or the card ID each designated in the acquisition request, in response to the acquisition request of the print information received from the image forming apparatus 20.

The print information receiving unit 61 and the print information providing unit 63 are substantialized by a process of at least one program installed on the storing server 60 and performed by the CPU of the storing server 60. The print information memory unit 62 is substantialized by an auxiliary memory device of the storing server 60, a memory device connected to the storing server 60 through the network, or the like.

The image forming apparatus 20 includes an authentication controlling unit 221, a print information acquiring unit 222, a print controlling unit 223, or the like. These units are substantialized when one or more programs installed in the image forming apparatus 20 are executed by the CPU 211. The authentication controlling unit 221 controls the authentication process at a time of login by sending the authentication request, in which the card ID read by the card 90 installed in the card reader 28, to the authentication relay server 70. In a case where the authentication is successful, the user name of the authenticated user is returned from the authentication relay server 70. In a case where the authentication based on the card ID of the guest card is successful, the card ID is returned from the authentication relay server 70.

The print information acquiring unit 222 sends an acquisition request of requesting to acquire the print information to the storing server 60. The user name or the card ID returned from the authentication relay server 70 is designated in the acquisition request. The print controlling unit 223 performs a print process to the print data acquired by the print information acquiring unit 222.

The authentication relay server 70 includes an authentication relay unit 71, a card information memory unit 72, and so on. The card information memory unit 72 stores the authenticated card ID, the user name of the authenticated user related to the authenticated card, and its password while associating the authenticated card ID with the user name and the password. Further, the card information memory unit 72 stores the card ID of the effective guest card.

The authentication relay unit 71 sends the authentication request based on the user name corresponding to the card ID and the corresponding password to the authentication server 50 in response to the authentication request, in which the card ID of the authenticated card is designated, received from the image forming apparatus 20. When the response indicative of the success of the authentication is returned from the authentication server 50, the authentication relay unit 71 returns the user name to the image forming apparatus 20. On the other hand, the authentication relay unit 71 confirms whether the card ID is stored in the card information memory unit 72 in response to the authentication request, in which the card ID of the guest card is designated. In a case where the card ID is stored in the card information memory unit 72, the authentication relay unit 71 returns the card ID to the image forming apparatus 20.

Figure 5:
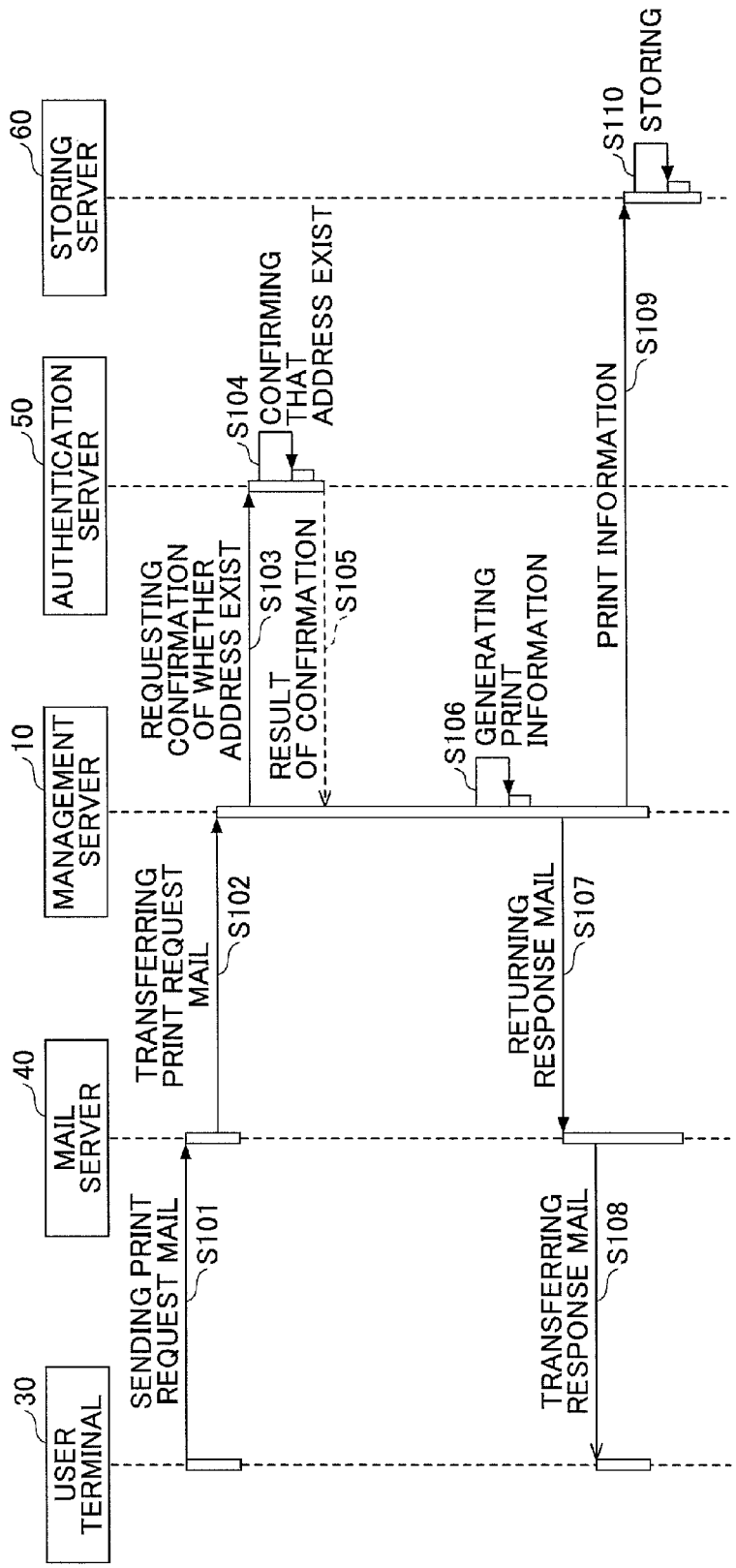
FIG. 5 is a sequence chart illustrating a procedure in a storing process of the first embodiment.

Hereinafter, the procedure performed by the print system 1 is described. FIG. 5 is a sequence chart illustrating a procedure in a storing process for storing the print data of the second embodiment of the present invention.

In step S101, the user terminal 30 sends the print request mail to the predetermined mail address in response to an input of instructing to send the print request mail. Electronic data to be printed is attached to the print request mail. The predetermined mail address is previously determined as a mail address to, for example, the management server 10.

The mail server 40 transfers the print request mail to the management server 10 in conformance with an ordinary communication protocol for transferring an email in response to an inquiry of the received mail, which is sent from the mail receiving unit 11 of the management server 10 to the predetermined destination address (S102).

When the print request mail is received by the mail receiving unit 11, the management server 10 designates the transmission source address of the print request mail and sends the existence confirming request to the authentication server 50 (S103). In response to the receipt of the existence confirming request, the request responding unit 51 of the authentication server 50 confirms whether the mail address designated by the existence confirming request is stored in the user information memory unit (S104).

FIG. 6 illustrates an exemplary structure of the user information memory unit. Referring to FIG. 6, the user information memory unit 52 stores user information for each authenticated user. The user information includes, for example, a user name, a password, a mail address, or the like. Multiple mail addresses for a personal computer (PC), a portable terminal, or the like may be registered for one user.

In step S104, the request responding unit 51 checks whether the mail address designated in the existence confirming request is included as a mail address included in the user information, which is stored in the user information memory unit 52.

The request responding unit 51 returns a response including the result of the confirmation to the management server 10 (S105). The result of the confirmation is information indicative whether the mail address exists or not. The information indicative whether the mail address exists is also information indicative whether the mail address of the print request mail on the transmission source is an authenticated address or a guest address. Meanwhile, the "authenticated address" is a mail address stored in the user information memory unit 52. Meanwhile, the "guest address" is a mail address, which is not stored in the user information memory unit 52.

In response to the receipt of the result of the confirmation, the management server 10 performs a generation process of the print information for the print request mail (S106). Subsequently, the mail returning unit 16 of the management server 10 returns the response mail response to the print request mail to the transmission source address of the print request mail (S107). The response mail is transferred to the user terminal 30, which is the transmission source of the print request mail, by the mail server 40 (S108). The response mail is generated by a print information generating process.

On the other hand, after returning the response mail, the print information sending unit 17 of the management server 10 sends the print information including the print data generated by the print information generating process, information associated with the print data, and so on to the storing server 60 (S109).

When the print information receiving unit 61 of the storing server 60 receives the print information, the print information is memorized (stored) in the print information memory unit 62 (S110).

FIG. 7 illustrates an exemplary structure of a print information memory unit of the first embodiment of the present invention. Referring to FIG. 7, the print information memory unit 62 stores the print information for each print data. The print information includes a job name, a user mode, a user code, print data, and so on.

The job name is identification information for each print data or for each print job performed for each print data. The user mode is information indicating whether the transmission source address of the print request mail is the authenticated address or the guest address. "U" designates that the authenticated address is the transmission source address, and "G" designates that the guest address is the transmission source address. The user code is the user name of the authenticated user for a record where the user mode is "U" and the card ID for a record where the user mode is "G".

Figure 8:
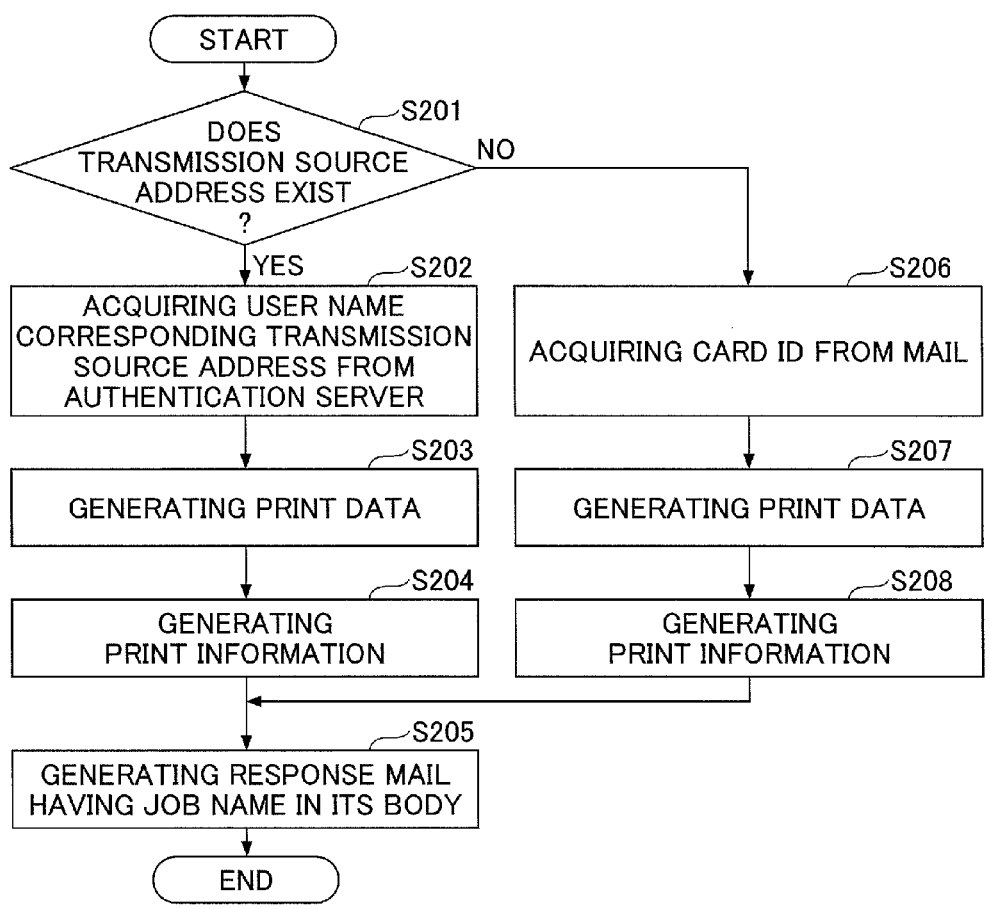
FIG. 8 is a flowchart for explaining an exemplary procedure of print information generating process of the first embodiment of the present invention.

Next, a detailed description of the step S106 is given below. FIG. 8 is a flowchart for explaining an exemplary procedure of print information generating process of the first embodiment of the present invention.

In step S201, the address confirming unit 12 determines whether the result of the confirmation received in step S105 of FIG. 5 indicates the existence of the transmission source address of the print request mail. In a case where the result of the confirmation indicates that the transmission source address exists (YES in S201), the address confirming unit 12 acquires the user name corresponding to the transmission source address from the authentication server 50 (S202). Said differently, in the user information memory unit 52, the user name associated with the transmission source address is acquired.

Subsequently, the print information generating unit 14 generates the print data of the body of the print request mail and the print data of the attached electronic data (the data to be printed) (S203). However, only the attached electronic data may be subject to generation of the print data. In a case where the electronic data are an archive file including multiple files in a zip type, the print information generating unit 14 decompresses the electronic data (the archive file) and generates the print data for each decompressed file. Therefore, multiple print data (the print jobs) are generated for one print request mail. In a case where the attached data is subject to printing and the attached data have a data format, which can be printed by the image forming apparatus 20, the print data may not be generated and the attached data may be treated as the print data as are in the following processes.

Subsequently, the print information generating unit 14 generates the print information for each print data (S204). Specifically, the job name is generated for each print data and is including in the print information. "U" is set to the user mode of each print information. In each print information, the user name acquired in step S202 is set up with a user code. The generated print information is sent to the storing server 60 in S109 of FIG. 5.

Subsequently, the response mail generating unit 15 generates a response mail, in the body of which, the job name of each print information is described (S205). In steps S107 and S108 of FIG. 5, the response mail is transferred to the user terminal 30 of the transmission source of the print request mail. The user who has browsed the response mail can know a job name corresponding to the print data, which are generated in response to the print request mail. However, when the transmission source address exists in the user information memory unit 52, it is not always necessary for the response mail to be returned. For example, in a case where the job name is generated based on the file name of the electronic data, the user can know the contents of the print data corresponding to each job name at a time of operating the image forming apparatus described below.

Meanwhile, in step S201, in a case where the result of the confirmation indicates that the transmission source address does not exist (NO of S201), the card ID acquiring unit 13 acquires the card ID designated in a predetermined format from the print request mail. The card ID acquiring unit 13 acquires the card ID designated in a predetermined format from the print request mail (S206).

Subsequently, the print information generating unit 14 generates the print data of the body of the print request mail and the print data of the attached electronic data (the data to be printed) (S207). The content of the process of step S207 may be similar to that of step S203.

Subsequently, the print information generating unit 14 generates the print information for each print data (S208). Specifically, the job name is generated for each print data and is including in the print information. "G" is set to the user mode of each print information. In each print information, the card ID acquired in step S206 is set up with the user code. The generated print information is sent to the storing server 60 in S109 of FIG. 5. Subsequently, step S205 is performed.

Thereafter, the user who sends the print request mail goes to the location of the image forming apparatus 20 and operates the image forming apparatus 20. Subsequently, described is the procedure performed by the image forming apparatus 20 in response to the operation of the user.

Figure 9:
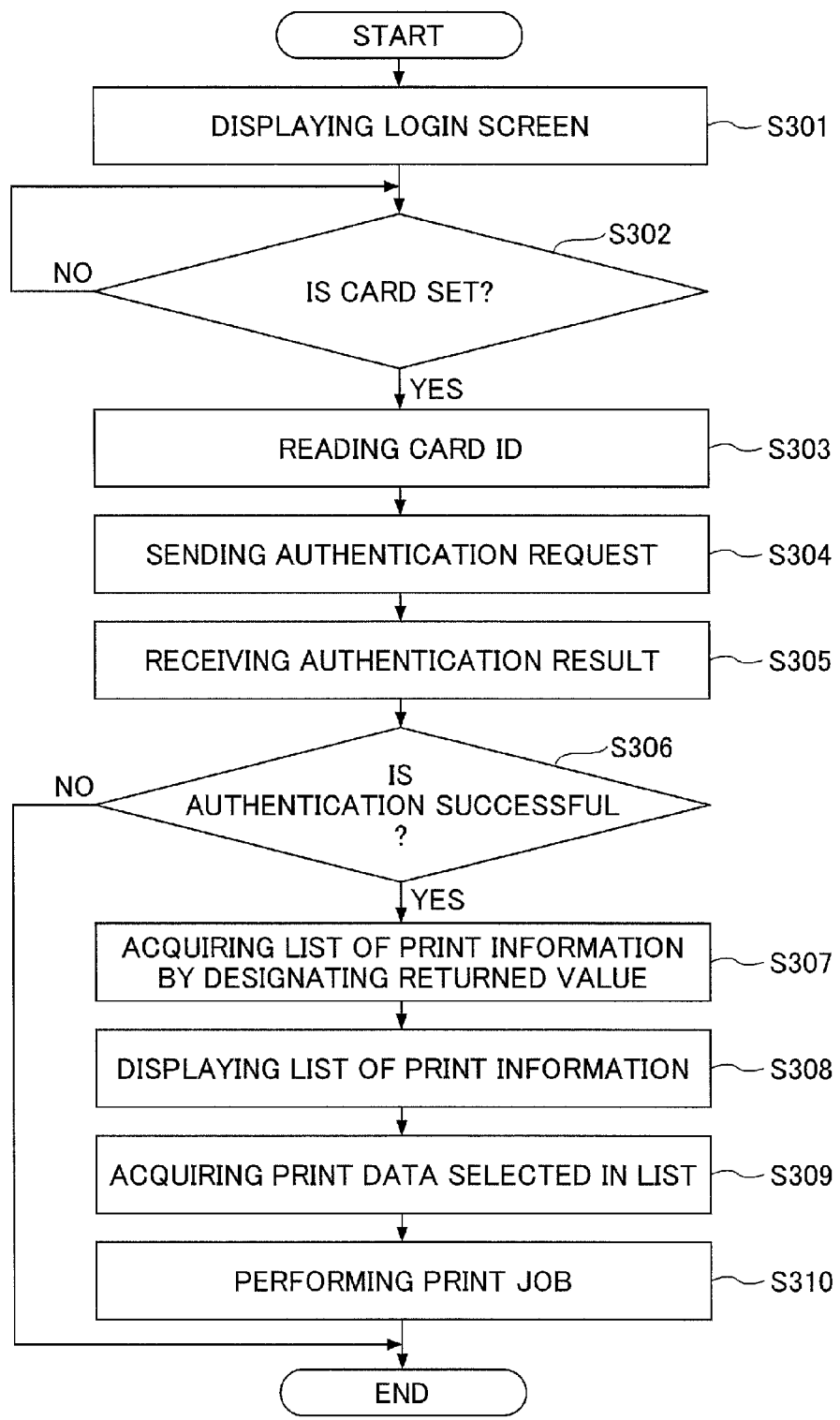
FIG. 9 is a flowchart illustrating an exemplary procedure of a process performed by an image forming apparatus of the first embodiment of the present invention.

FIG. 9 is a flowchart illustrating an exemplary procedure of a process performed by an image forming apparatus of the first embodiment of the present invention.

For example, in response to a call of a print function of the print data, which are stored in the storing server 60, the authentication controlling unit 221 causes a login screen to be displayed on an operation panel 25 (S301) and waits for a setup of the card 90 to the card reader 28 (S302). The setup of the card 90 into the card reader 28 includes inserting the card into the card reader 28 and bringing the card 90 closer to the card reader 110 in order to make the card reader 28 read information recorded in the card 90.

When the card 90 is set to the card reader (YES of S302), the authentication controlling unit 221 uses the card reader 28 to read the card ID recorded in the card 90 (S303). Subsequently, the authentication controlling unit 221 sends the authentication request where the card ID is designated to the authentication relay unit 71 of the authentication relay server 70 (S304). The process performed by the authentication relay unit 71 in response to the authentication request is described later. In a case where the authentication is successful, the user name or the card ID is returned from the authentication relay unit 71. In a case where the card ID to be authenticated is the card ID of the authenticated card, the user name of the authenticated user related to the card ID is returned. In a case where the card ID to be authenticated is the card ID of the guest card, the card ID is returned. In a case where the authentication is failed, a response indicative of the authentication error is returned.

The image forming apparatus 20 needs not distinguish whether a value returned in a case where the authentication is successful is the user name or the card ID.

In a case where the authentication is failed (NO of S306), the process on or after step S307 is not performed. In a case where the authentication is successful (YES of S306), the print information acquiring unit 222 designates the user name or the card ID returned from the authentication relay unit 71 and acquires a list of the print information from the storing server 60 (S307). Specifically, the print information acquiring unit 222 designates the user ID and the card ID, and sends an acquisition request of acquiring the list of the print information to the storing server 60. In response to the acquisition request, the print information providing unit 63 of the storing server 60 acquires the print information including a user code matching the user name or the card ID, which is designated in the acquisition request, from the print information memory unit 62 (FIG. 7).

The print information providing unit 63 returns the acquired list of the print information to the image forming apparatus 20. The print data may not be included in each print information to be returned.

Subsequently, the print information acquiring unit 222 of the image forming apparatus 20 causes the list of the job names included in each returned print information into the operation panel 25 (S308). This list is a candidate to be printed. Said differently, the user can input an instruction of executing the print for the print information included in the list.

When at least one job name is selected from the list, the print information acquiring unit 222 acquires the print data corresponding to the job name from the storing server 60 (S309). Specifically, the print information acquiring unit 222 sends an acquisition request of acquiring the print data, in which the job name is designated, to the storing server 60. The print information providing unit 63 of the storing server 60 returns the print data corresponding to the job name designated by the acquisition request to the image forming apparatus 20 in response to the acquisition request.

In step S307, if the print information corresponding to one print data is acquired in step S307, the process of S308 is not performed. The print information acquiring unit 222 may acquire the print data. Further, the print information providing unit 63 may return the print data including a user code, which matches the user name or the card ID, instead of returning the list of the print information to the image forming apparatus 20.

Subsequently, the print controlling unit 223 controls an execution of the print job related to the print data (S310). As a result, a paper, on which the print data are printed, is output. For example, in a case where a log is recorded for an executed print job, the log may include the user name or the card ID. When the card ID is recorded in the log, it is possible to specify which guest user performs the print job by checking on a lending history of the guest card. Further, as described later, the card ID is associated with the authenticated user. Therefore, it is possible to apply a psychological suppression effect to an unauthorized use of the guest card by the authenticated user and also to an unauthorized use of the image forming apparatus 20 by the guest user.

Figure 10:
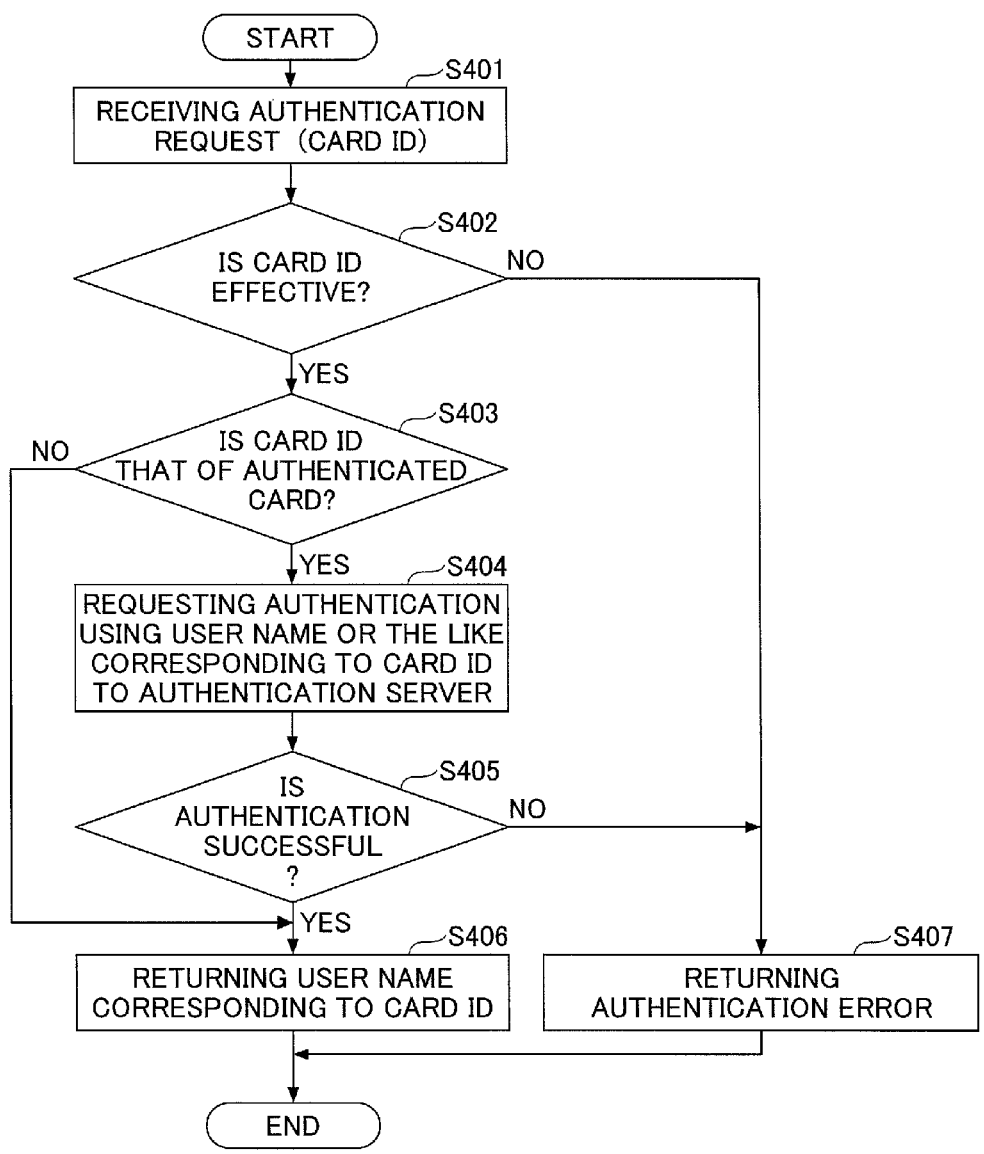
FIG. 10 is a flowchart for explaining an exemplary procedure of an authentication relay process.

Subsequently, in response to the authentication request sent in step S304, the procedure of the authentication relay process performed by the authentication relay unit 71 of the authentication relay server 70 is described. FIG. 10 is a flowchart for explaining an exemplary procedure of the authentication relay process.

In step S401, the authentication relay unit 71 receives the authentication request where the card ID is designated. Subsequently, the authentication relay unit 71 determines that the card ID is effective. The determination is performed based on whether the card ID is stored in the card information memory unit 72.

FIG. 11 illustrates an exemplary structure of a card information memory unit. Referring to FIG. 11, the card information memory unit 72 stores a user name, a password, a user mode, an authenticated user name, and so on in association with an effective card ID.

The user name and the password are those of the user who has the authenticated card related to the card ID. As to the card ID related to the guest card, the same value as the card ID is used as the user name and the password is blank. For example, referring to FIG. 11, the user name of the record whose card ID is "9001" is "9001".

The user mode is an item indicative of whether the card 90 related to the card ID is the authenticated card or the guest card. Hereinafter, "U" designates the authenticated user card and "G" designates the guest user card. The authenticated user name is an item effective for a record related to the guest card and represents the user name of the authenticated user who is responsible for a use of the image forming apparatus 20 based on the guest card. The user who has the responsibility for the print job is, for example, a user who has to bear the expense for the print job (however, an entity which actually bear the expense may be a department to which the user belongs), a user recorded in association with a log related to the print job, or a user whose account for the print job is added in an environment where the account (the accumulated number of sheets) of the number of printed sheets output for each authenticated user is managed.

As described, in the card information memory unit 72, the card ID of the authenticated card is associated with the user name indicative of the authenticated user, who is a specific user of the authenticated card. On the other hand, the user name stored corresponding to the card ID of the guest card does not indicate a specific user of the guest card.

In a case where the card ID designated in the authentication request is stored in the card information memory unit 72 (YES of S402), the authentication relay unit 71 determines whether the card ID is the card ID of the authenticated card (S403). The determination can be performed by referring to the user mode, which corresponds to the card ID and is stored in the card information memory unit 72.

In a case where the card ID is that of the authenticated card (YES of S403), the authentication relay unit 71 sends the authentication request, in which the user name and the password stored in the card information memory unit 71 in association with the card ID, to the authentication server 50 (S404). The request responding unit 51 of the authentication server 50 determines whether the set of the user name and the password designated in the authentication request is stored in the user information memory unit 52. In a case where the set is stored in the user information memory unit 52, authentication is successful. In a case where the set is not stored in the user information memory unit 52, the authentication is failed. The request responding unit 51 returns information indicative of the success or the failure of the authentication to the authentication relay unit 71.

In a case where the authentication is successful (YES of S405), the authentication relay unit 71 returns the user name stored in the card information memory unit 72 in association with the card ID to the authentication controlling unit 221 of the image forming apparatus 20.

On the other hand, in a case where the card ID is not the card ID of the authenticated card (NO of S403), the authentication relay unit 71 performs step S406 without performing steps S404 and S405. The user name associated with the card ID of the guest card is the card ID. Therefore, the card ID is returned in step S406.

Further, in a case where the card ID designated in the authentication require is not stored in the card information memory unit 72 (NO of S402) or in a case where the authentication is failed (NO of S405), the authentication relay unit 71 returns the authentication error to the authentication controlling unit 221 (S407).

In the card information memory unit 72 of the first embodiment, the card ID is stored as the user name corresponding to the card ID of the guest card. However, the user name (for example, "visitor 1") for the guest user other than a character string of the card ID may be stored as the user name corresponding to the card ID of the guest card. In this case, it is preferable that a different user name is associated with each card ID of the guest card.

In a case where the user name associated with the card ID is a user name of the guest user, the user name may be designated in the print request mail. With this, the user name of the guest user is included as the user code. The user name for the guest user is returned from the authentication relay unit 71 as the user name corresponding to the card ID. Therefore, the image forming apparatus 20 can acquire the print information corresponding to the card ID.

Instead of the user name for the guest user, information that can be specified based on the card ID can be used as a value designated in the print request mail.

Further, the card 90 can be replaced by a portable terminal such as a mobile phone, a smart phone, a tablet-type terminal, or the like. In this case, the image forming apparatus 20 may communicate with the portable terminal and acquires information corresponding to the card ID from the portable terminal.

As described, within the first embodiment, even if the account such as the user name or the password of a guest user is not registered in the authentication server 50, the operation authority of the image forming apparatus 20 can be given to the guest user by lending the guest card to the guest user. Therefore, it is possible to reduce chances of requesting printing from the guest user to the authenticated user. Further, by designating the card IDs to the print request mails from the guest users, the print information is controlled so as to be associated with each guest user. As a result, it is possible to prevent a situation where the print data of a guest user can be easily operated by another guest user from occurring.

Further, it is possible to reduce chances of installing an image forming apparatus 20 exclusively used for the guest user.

Second Embodiment

Next, a second embodiment is described. Differences of the second embodiment from the first embodiment are described below. Features of the second embodiment, which are not specifically described, are substantially the same as those of the first embodiment.

Within the second embodiment, it is required to designate an authenticated address of any authenticated user in a carbon copy (Cc) of a print request mail sent by a guest user. Hereinafter, the mail address designated in Cc is referred to as a "Cc address".

An exemplary authenticated address designated in the Cc address is the authenticated address of an authenticated user who belongs to a department bearing the expense for printing by the guest user job. For example, the guest user may print a material for a meeting with the authenticated user belonging to the department, and may designate the mail address of the authenticated user to the Cc address upon a consent of the authenticated user.

FIG. 12 is a sequence chart illustrating a procedure in a storing process for storing the print data of the second embodiment of the present invention. Referring to FIG. 12, the same reference symbols as those in FIG. 5 are given to the corresponding portions, and explanation of these portions is omitted.

Referring to FIG. 12, steps S111 to S113 are added between steps S105 and S106. Steps S111 to S113 are performed in a case where the result of the confirmation returned in step S105 indicates that the transmission source address does not exist. Said differently, steps S111 to S113 are performed for the print request mail received from the guest address.

In step S111, in a case where the Cc address is designated in the print request mail, the address confirming unit 12 designates the Cc address and sends an existence confirming request of confirming an existence of the Cc address to the authentication server 50.

In a manner similar to step S104, in response to the receipt of the existence confirming request, the request responding unit 51 of the authentication server 50 confirms whether the Cc address designated by the existence confirming request is stored in the user information memory unit (S112). The request responding unit 51 returns a response including the result of the confirmation to the management server 10

(S113). The result of the confirmation includes, for example, the user name corresponding to the Cc address. As a result, the user name corresponding to the Cc address is specified by the address confirming unit 12.

Subsequently, step S106 is performed based on the result of the confirmation received in step S105 or S113. Next, a detailed description of step S106 is given below.

FIG. 13 is a flowchart for explaining an exemplary procedure of print information generating process of the second embodiment of the present invention. Referring to FIG. 13, the same reference symbols as those in FIG. 8 are given to the corresponding portions, and explanation of these portions is omitted.

Referring to FIG. 13, in a case where the result of the confirmation received in step S105 of FIG. 12 indicates non-existence of the transmission source address of the print request mail (NO of S201) and in a case where the result of the confirmation received in step S113 indicates an existence of the Cc address (YES of S210), steps S206 to S209 are performed. In a case where the user name of the authenticated user is specified based on the Cc address, steps S206 to S209 are performed. In the print information generated in step S208, the user name of the authenticated user returned in step S113 may further be included. Thus, the print information related to the guest user can be associated with the authenticated user.

On the other hand, in a case where both the transmission source address and the Cc address do not exist or in a case where the transmission source address does not exist and the Cc address is not designated (NO of S210), the response mail generating unit 15 generates a response mail (hereinafter, referred to as an "error mail") including a rejection of the print request (S211). In this case, the error mail is returned in step S107 of FIG. 12. Further, in this case, the print information is not generated. Said differently, the user cannot print.

Within the second embodiment, an authenticated address of any authenticated user is designated in a carbon copy (Cc) address of a print request mail sent by a guest user. As a result, it is possible to associate the authenticated user with a print job by the guest user. Based on the association, it is possible to determine the billing destination of the expense for the print based on the association.

Further, there may be a case where the authenticated user is treated as the guest user when the authenticated user sends the print request mail from a mail address other than the authenticated address. In this case, because a designation of the authenticated address is required to the Cc address of the print request mail, it is possible to determine the billing destination of the expense for the print job.

The location where the authenticated address is designated may not be "Cc". The authenticated address may be designated to "Bcc" or may be designated to "To" together with the address of the destination of the print request mail. Said differently, it is sufficient that the authenticated address is included in the transmission destination of the print request mail. In any case of "Cc", "Bcc", or "To", the authenticated user can detect the registration of the print job in the own name of the authenticated user when the print request mail sent by the guest user is sent to the authenticated user. As a result, the authenticated user can detect registration of an unfair print job.

Further, the authenticated address may be designated in the body of the print request mail. In this case, the management server 10 may transfer the print request mail to the authenticated address designated in the body.

Within the above embodiments, the examples where the print request mail is sent as the email are described. However, a communication means for the print request may not be limited to the email. For example, these print requests may be performed using a web interface or another communication means. For example, in a case of the web interface, the destination address of the print request mail may be replaced by a predetermined URL. Further, the transmission source address may be replaced by the IP address of the transmission source of the print request. For example, the user information memory unit 52 may store the IP address of the user terminal 30 used by the authenticated user in place of the mail address or together with the mail address.

Within the embodiments, the system including the management server 10, the authentication server 50, and the storing server 60 is an example of the information processing system. The transmission source address is an example of first identification information. The user name of the authenticated user is an example of user identification information. The card ID is an example of the second identification information and medium identification information. The mail receiving unit 11 is an example of first receiving unit. The user information memory unit 52 is an example of a first memory unit. The address confirming unit 12 is an example of a first specifying unit and a second specifying unit. The card ID acquiring unit 13 is an example of an acquiring unit. The print information memory unit 62 is an example of a second memory unit. The print information receiving unit 61 is an example of a second receiving unit. The print information providing unit 63 is an example of a sending unit. The card 90 is an example of a portable recording medium. The card information memory unit 72 is an example of a third memory unit. The authentication relay unit 71 and the authentication controlling unit 221 are an example of an authentication unit.

The Cc address of the print request mail is an example of a third identification information. The mail returning unit 16 is an example of a returning unit.

An apparatus can be used by a user even if the user does not have the operation authority of the apparatus.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although an information processing system has been described in detail, it should be understood that various changes, substitutions, and alterations could be made thereto without departing from the spirit and scope of the invention.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device.

The computer software can be provided to the programmable device using any recording medium for storing processor readable code such as a floppy disk, hard disk, CD ROM, magnetic tape device or solid state memory device.)

The hardware platform includes any desired hardware resources including, for example, a central processing unit (CPU), a random access memory (RAM), and a hard disk drive (HDD). The CPU may include processors of any desired kinds and numbers. The RAM may include any desired volatile or nonvolatile memories. The HDD may include any desired nonvolatile memories capable of recording a large amount of data. The hardware resources may further include an input device, an output device, and a network device in accordance with the type of the apparatus. The HDD may be provided external to the apparatus as long as the HDD is accessible from the apparatus. In this case, the CPU, for example, the cache memory of the CPU, and the RAM may operate as a physical memory or a primary memory of the apparatus, while the HDD may operate as a secondary memory of the apparatus.

This application is based upon and claims the benefit of priority of the prior Japanese Patent Application No. 2013-153547, filed on Jul. 24, 2013, the entire contents of which are incorporated herein by reference.

What is claimed is:

1. An information processing system including at least one computer, the information processing system comprising:
    a first receiving unit that receives a print request;
    a first specifying unit that specifies user identification information stored in a first memory unit in association with first identification information related to a transmission source of the print request;
    an acquiring unit that acquires second identification information from the print request when the user identification information is not specified by the first specifying unit;
    a second memory unit that stores data related to the print request in association with the user identification information when the first specifying unit specifies the user identification information or stores the data related to the print request in association with the second identification information when the first specifying unit does not specify the user identification information and the acquiring unit acquires the second identification information;
    a second receiving unit that receives the user identification information or the second identification information from an apparatus connected with the information processing system through a network; and
    a sending unit that sends the data associated with the received user identification information or the data associated with the received second identification information and stored in the second memory unit to the apparatus.

2. The information processing system according to claim 1, wherein the second identification information is a medium identification information read from a portable recording medium by the apparatus or identification information associated with the medium identification information.

3. The information processing system according to claim 1, the information processing system further comprising:
    a third memory unit that stores the second identification information and the user identification information by associating the second identification information with the user identification information,
    wherein, when the second memory unit stores data related to the print request in association with the second identification information that is acquired by the acquiring unit, the second memory unit associates the user identification information, which is stored in the third memory unit in association with the second identification information, with the data related to the print request.

4. The information processing system according to claim 1, wherein, in a case where the medium identification information read by the apparatus from the recording medium is associated with the user identification information indicative of a specific user of the portable recording medium, the second receiving unit receives the user identification information from the apparatus,
    wherein, in a case where the medium identification information read by the apparatus from the recording medium is not associated with the user identification information indicative of the specific user of the portable recording medium, the second receiving unit receives the medium identification information or the identification information related to the medium identification information from the apparatus as the second identification information.

5. The information processing system according to claim 1, further comprising:
    a second specifying unit that specifies the user identification information stored in the first memory unit in association with third identification information that is included in the print request designating the second identification information; and
    a returning unit that returns information indicative of a rejection of the print request to the transmission source of the print request in a case where the user identification information is not specified by the second specifying unit.

6. The information processing system according to claim 5, wherein, in a case where the user identification information is specified by the second specifying unit, the second memory unit stores data related to the print request in association with the second identification information that is acquired by the acquiring unit.

7. An information processing apparatus including at least one computer, the information processing apparatus comprising:
    a first receiving unit that receives a print request;
    a first specifying unit that specifies user identification information stored in a first memory unit in association with first identification information related to a transmission source of the print request;
    an acquiring unit that acquires second identification information from the print request when the user identification information is not specified by the first specifying unit;
    a second memory unit that stores data related to the print request in association with the user identification information when the first specifying unit specifies the user identification information or stores the data related to the print request in association with the second identification information when the first specifying unit does not specify the user identification information and the acquiring unit acquires the second identification information;
    a second receiving unit that receives the user identification information or the second identification information from an apparatus connected with the information processing apparatus through a network; and
    a sending unit that sends the data associated with the received user identification information or the data associated with the received second identification information and stored in the second memory unit to the apparatus.

8. The information processing apparatus according to claim 7,
wherein the second identification information is a medium identification information read from a portable recording medium by the apparatus or identification information associated with the medium identification information.

9. The information processing apparatus according to claim 7, the information processing apparatus further comprising:
a third memory unit that stores the second identification information and the user identification information by associating the second identification information with the user identification information,
wherein, when the second memory unit stores data related to the print request in association with the second identification information that is acquired by the acquiring unit, the second memory unit associates the user identification information, which is stored in the third memory unit in association with the second identification information, with the data related to the print request.

10. The information processing apparatus according to claim 7,
wherein, in a case where the medium identification information read by the apparatus from the recording medium is associated with the user identification information indicative of a specific user of the portable recording medium, the second receiving unit receives the user identification information from the apparatus,
wherein, in a case where the medium identification information read by the apparatus from the recording medium is not associated with the user identification information indicative of the specific user of the portable recording medium, the second receiving unit receives the medium identification information or the identification information related to the medium identification information from the apparatus as the second identification information.

11. The information processing apparatus according to claim 7, further comprising:
a second specifying unit that specifies the user identification information stored in the first memory unit in association with third identification information that is included in the print request designating the second identification information; and
a returning unit that returns information indicative of a rejection of the print request to the transmission source of the print request in a case where the user identification information is not specified by the second specifying unit.

12. The information processing apparatus according to claim 11,
wherein, in a case where the user identification information is specified by the second specifying unit, the second memory unit stores data related to the print request in association with the second identification information that is acquired by the acquiring unit.

13. A method of processing information in an information processing system including at least one computer, the method of processing the information comprising:
receiving, by a first receiving unit, a print request;
specifying, by a first specifying unit, user identification information stored in a first memory unit in association with first identification information related to a transmission source of the print request;
acquiring, by an acquiring unit, second identification information from the print request when the user identification information is not specified by the first specifying unit;
storing, by a second memory unit, data related to the print request in association with the user identification information when the first specifying unit specifies the user identification information or stores the data related to the print request in association with the second identification information when the first specifying unit does not specify the user identification information and the acquiring acquires the second identification information;
receiving, by a second receiving unit, the user identification information or the second identification information from an apparatus connected with the information processing system through a network; and
sending, by a sending unit, the data associated with the received user identification information or the data associated with the received second identification information and stored in the second memory unit to the apparatus.

14. The method of processing the information according to claim 13,
wherein the second identification information is a medium identification information read from a portable recording medium by the apparatus or identification information associated with the medium identification information.

15. The method of processing the information according to claim 13, the method of processing the information further comprising:
storing, by a third memory unit, the second identification information and the user identification information by associating the second identification information with the user identification information,
wherein, when the second memory unit stores data related to the print request in association with the second identification information that is acquired by the acquiring unit, the second memory unit associates the user identification information, which is stored in the third memory unit in association with the second identification information, with the data related to the print request.

16. The method of processing the information according to claim 13,
wherein, in a case where the medium identification information read by the apparatus from the recording medium is associated with the user identification information indicative of a specific user of the portable recording medium, the second receiving unit receives the user identification information from the apparatus,
wherein, in a case where the medium identification information read by the apparatus from the recording medium is not associated with the user identification information indicative of the specific user of the portable recording medium, the second receiving unit receives the medium identification information or the identification information related to the medium identification information from the apparatus as the second identification information.

17. The method of processing the information according to claim 13, further comprising:
specifying, by a second specifying unit, the user identification information stored in the first memory unit in association with third identification information that is included in the print request designating the second identification information; and returning, by a returning unit, information indicative of a rejection of the print request to the transmission source of the print request in a case where the user identification information is not specified by the second specifying unit.

18. The method of processing the information according to claim 17, wherein, in a case where the user identification information is specified by the second specifying unit, the second memory unit stores data related to the print request in association with the second identification information that is acquired by the acquiring unit.

* * * * *